(12) United States Patent
Chang et al.

(10) Patent No.: US 11,310,661 B2
(45) Date of Patent: Apr. 19, 2022

(54) SECURITY KEY SYNCHRONIZATION METHOD AND ASSOCIATED COMMUNICATIONS APPARATUS

(71) Applicant: MEDIATEK INC., Hsin-Chu (TW)

(72) Inventors: Yu-Lun Chang, Hsinchu (TW); Shih-Chieh Liao, Hsinchu (TW)

(73) Assignee: MEDIATEK INC., Hsin-Chu (TW)

( * ) Notice: Subject to any disclaimer, the term of this patent is extended or adjusted under 35 U.S.C. 154(b) by 142 days.

(21) Appl. No.: 16/790,762

(22) Filed: Feb. 14, 2020

(65) Prior Publication Data

US 2021/0258779 A1 Aug. 19, 2021

(51) Int. Cl.
| | | |
|---|---|---|
| *H04L 9/32* | (2006.01) | |
| *H04W 12/04* | (2021.01) | |
| *H04L 29/06* | (2006.01) | |
| *H04W 12/08* | (2021.01) | |
| *H04W 12/06* | (2021.01) | |

(52) U.S. Cl.
CPC ............. *H04W 12/04* (2013.01); *H04L 63/06* (2013.01); *H04L 63/205* (2013.01); *H04W 12/06* (2013.01); *H04W 12/08* (2013.01)

(58) Field of Classification Search
USPC .......................................................... 713/171
See application file for complete search history.

(56) References Cited

U.S. PATENT DOCUMENTS

| | | | | |
|---|---|---|---|---|
| 2009/0025060 | A1* | 1/2009 | Mukherjee | H04W 12/037 726/3 |
| 2017/0195882 | A1* | 7/2017 | Liao | H04L 63/20 |

FOREIGN PATENT DOCUMENTS

| | | |
|---|---|---|
| CN | 101483865 A | 7/2009 |
| CN | 101790168 B | 5/2015 |

\* cited by examiner

*Primary Examiner* — William J. Goodchild
*Assistant Examiner* — Samuel Ambaye
(74) *Attorney, Agent, or Firm* — Winston Hsu

(57) ABSTRACT

A communications apparatus includes a transceiver and a processor. The processor is configured to perform operations comprising: performing a Non Access Stratum (NAS) security mode command procedure to derive a set of NAS key(s); transmitting a NAS security mode complete message to a network device for informing that the NAS security mode command procedure is complete; receiving an RRCReconfiguration message indicating derivation of a set of Access Stratum (AS) keys from the network device when an acknowledge message associated with the NAS security mode complete message has not been received; and performing a NAS procedure to communicate with the network device by using the set of NAS key(s).

10 Claims, 7 Drawing Sheets

SECURITY KEY SYNCHRONIZATION METHOD AND ASSOCIATED COMMUNICATIONS APPARATUS

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power). Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. Long Term. Evolution (LTE) is a set of enhancements to the Universal Mobile Telecommunications System (UMTS) mobile standard promulgated by Third Generation Partnership Project (3GPP). 5G New Radio (NR) is a new Radio Access Technology (RAT) developed by 3GPP for the 5G (fifth generation) mobile network.

Security configuration is an initial step in setting up a logical bearer or channel (e.g., a communication link between a mobile communication device and a network entity or access node) in LTE and 5G networks. Key derivation and establishment is a part of this security configuration. The security keys maintained by the mobile communication device and the network entity or access node should be synchronous. However, in some abnormal scenario, the security keys maintained by the mobile communication device and the network entity or access node may be out of synchronization. To solve this problem, a novel security key synchronization method and the associated communications apparatus are required.

SUMMARY

It is an objective of the invention to provide novel security key synchronization methods and the associated communications apparatus, in order to solve the key asynchronization problem.

According to an embodiment of the invention, a communications apparatus comprises a transceiver and a processor. The transceiver is configured to transmit or receive wireless signals to communicate with a network device. The processor is coupled to the transceiver and configured to perform operations comprising: performing a Non Access Stratum (NAS) security mode command procedure to derive a set of NAS key(s) in response to a NAS security mode command message received from the network device; transmitting a NAS security mode complete message to the network device for informing the network device that the NAS security mode command procedure is complete; receiving an RRCReconfiguration message indicating derivation of a set of Access Stratum (AS) keys from the network device when an acknowledge message associated with the NAS security mode complete message has not been received from the network device; and performing a NAS procedure to communicate with the network device by using the set of NAS key(s).

According to another embodiment of the invention, a security key synchronization method for synchronizing security key(s) derived by a communications apparatus with security key(s) derived by a network device performed by a processor of the communications apparatus and comprises: performing a Non Access Stratum (NAS) security mode command procedure to derive a set of NAS key(s) in response to a NAS security mode command message received from the network device; transmitting a NAS security mode complete message to the network device for informing the network device that the NAS security mode command procedure is complete; receiving an RRCReconfiguration message indicating derivation of a set of Access Stratum (AS) keys from the network device when an acknowledge message associated with the NAS security mode complete message has not been received from the network device; and performing a NAS procedure to communicate with the network device by using the set of NAS key(s).

These and other objectives of the present invention will no doubt become obvious to those of ordinary skill in the art after reading the following detailed description of the preferred embodiment that is illustrated in the various figures and drawings.

DETAILED DESCRIPTION

Figure 1:
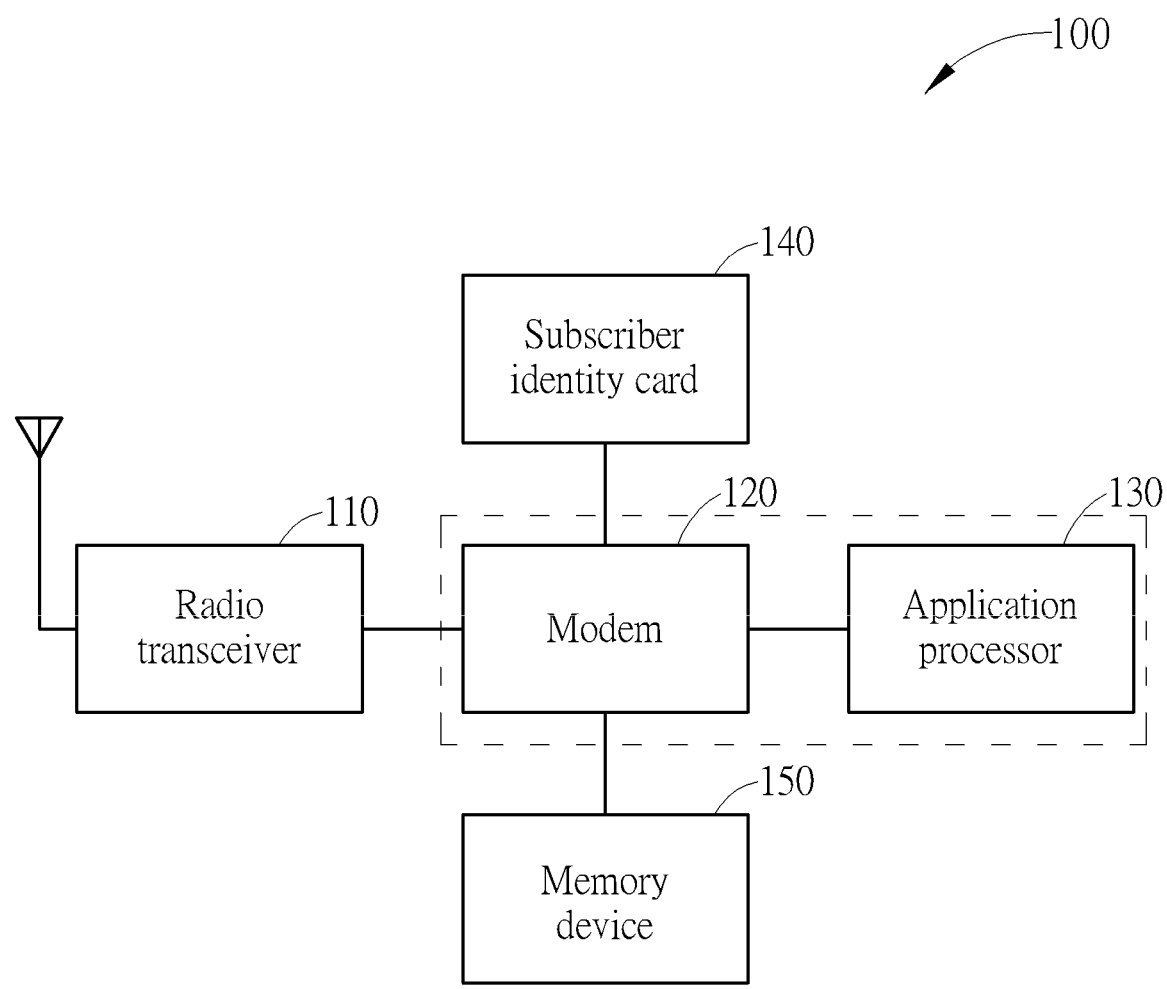
FIG. 1 shows an exemplary block diagram of a communications apparatus according to an embodiment of the invention.

FIG. 1 shows an exemplary block diagram of a communications apparatus according to an embodiment of the invention. The communications apparatus 100 may be a portable electronic device, such as a Mobile Station (MS, which may be interchangeably referred to as User Equipment (UE)). The communications apparatus 100 may comprise at least an antenna module comprising at least one antenna, a radio transceiver 110, a modem 120, an application processor 130, a subscriber identity card 140, and a memory device 150. The radio transceiver 110 may receive wireless radio frequency signals from an air interface via the antenna module, transmit wireless radio frequency signals to the air interface via the antenna module and perform RF signal processing. For example, the radio transceiver 110 may convert the received signals into intermediate frequency (IF) or baseband signals to be processed, or receive the IF or baseband signals from the modem 120 and convert the received signals into wireless radio frequency signals to be transmitted to a network device in a cellular network. According to an embodiment of the invention, the network device may be a cell, a node B, an evolved node B (eNB), a g node B (gNB), a base station, a Mobility Management Entity (MME) etc., at the network side of the cellular network and communicating with the communications apparatus 100 via the wireless radio frequency signals.

The radio transceiver 110 may comprise a plurality of hardware devices to perform radio frequency conversion and RF signal processing. For example, the radio transceiver 110 may comprise a power amplifier for amplifying the RF signals, a filter for filtering unwanted portions of the RF signals and/or a mixer for performing radio frequency conversion. According to an embodiment of the invention, the radio frequency may be, for example, the frequency of any specific frequency band for a LTE system, or the frequency of any specific frequency band for a 5G NR system, etc.

The modem 120 may be a cellular communications modem configured to handle corresponding communications protocol operations and processing the IF or baseband signals received from or to be transmitted to the radio transceiver 110. The application processor 130 is configured to run the operating system of the communications apparatus 100 and run application programs installed in the communications apparatus 100. In the embodiments of the invention, the modem 120 and the application processor 130 may be designed as discrete chips with some buses or hardware interfaces coupled therebetween, or they may be integrated into a combo chip (i.e., a system on chip (SoC)), and the invention should not be limited thereto.

The subscriber identity card 140 may be a SIM, USIM, R-UIM or CSIM card, or the like and may typically contain user account information, an International Mobile Subscriber Identity (IMSI) and a set of SIM application toolkit (SAT) commands and may provide storage space for phone book contacts. The memory device 150 may be coupled to the modem 120 and application processor 130 and may store system data or user data.

It should be noted that, in order to clarify the concept of the invention, FIG. 1 presents a simplified block diagram in which only the elements relevant to the invention are shown. For example, in some embodiments of the invention, the communications apparatus may further comprise some peripheral devices not shown in FIG. 1. In another example, in some embodiments of the invention, the communications apparatus may further comprise a central controller coupled to the modem 120 and the application processor 130. Therefore, the invention should not be limited to what is shown in FIG. 1.

In some embodiments of the invention, the communications apparatus is capable of supporting multiple radio access technologies (RATs) communications via the single-card structure as shown in FIG. 1. It should be noted that, although FIG. 1 shows a single-card application, the invention should not be limited thereto. For example, in some embodiments of the invention, the communications apparatus may comprise multiple subscriber identity cards to support the multi-RATs communications, in either a single-standby or a multiple-standby manner. In the multi-RATs communications applications, the modem, the radio transceiver and/or the antenna module may be shared by the subscriber identity card(s) and may have the capability of handling the operations of different RATs and processing the corresponding RF, IF or baseband signals in compliance with the corresponding communications protocols.

In addition, those who are skilled in this technology can still make various alterations and modifications based on the descriptions given above to derive the communications apparatuses comprising multiple radio transceivers and/or multiple antenna modules for supporting multi-RAT wireless communications without departing from the scope and spirit of this invention. Therefore, in some embodiments of the invention, the communications apparatus may be designed to support a multi-card application, in either a single-standby or a multiple-standby manner, by making some alterations and modifications.

It should be further noted that the subscriber identity card 140 may be dedicated hardware cards as described above, or in some embodiments of the invention, there may be individual identifiers, numbers, addresses, or the like which are burned in the internal memory device of the corresponding modem and are capable of identifying the communications apparatus. Therefore, the invention should not be limited to what is shown in the figures.

It should be further noted that in some embodiments of the invention, the communications apparatus may further support multiple IMSIs.

Figure 2:
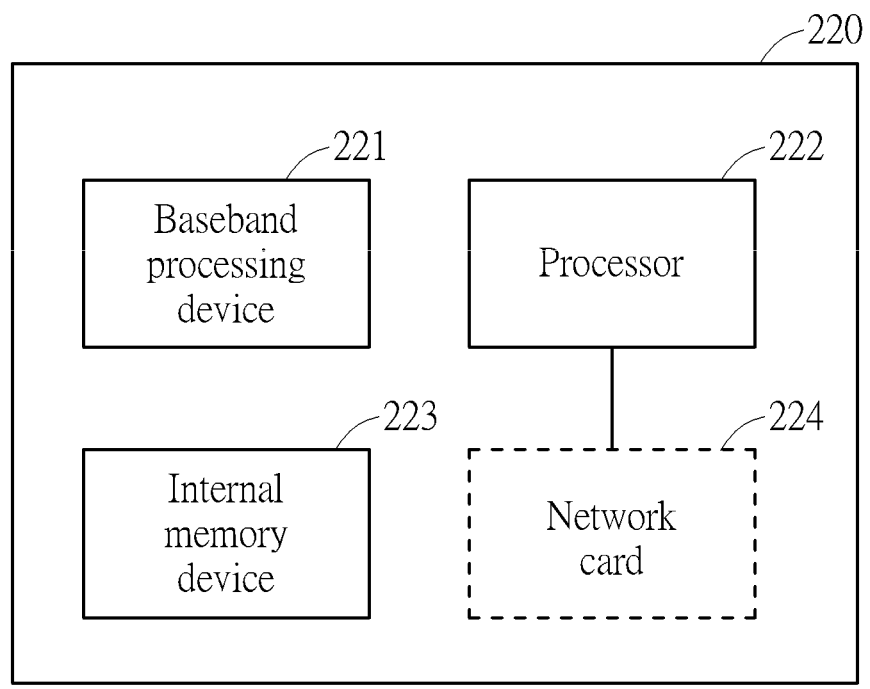
FIG. 2 shows an exemplary block diagram of a modem according to an embodiment of the invention.

FIG. 2 shows an exemplary block diagram of a modem according to an embodiment of the invention. The modem 220 may be the modem 120 shown in FIG. 1 and may comprise at least a baseband processing device 221, a processor 222, an internal memory device 223 and a network card 224. The baseband processing device 221 may receive the IF or baseband signals from the radio transceiver 110 and perform IF or baseband signal processing. For example, the baseband processing device 221 may convert the IF or baseband signals into a plurality of digital signals, and process the digital signals, and vice versa. The baseband processing device 221 may comprise a plurality of hardware devices to perform signal processing, such as an analog-to-digital converter for ADC conversion, a digital-to-analog converter for DAC conversion, an amplifier for gain adjustment, a modulator for signal modulation, a demodulator for signal demodulation, an encoder for signal encoding, a decoder for signal decoding, and so on.

According to an embodiment of the invention, the baseband processing device 221 may be designed to have the capability of handling the baseband signal processing operations for different RATs and processing the corresponding IF or baseband signals in compliance with the corresponding communications protocols, so as to support the multi-RAT wireless communications. According to another embodiment of the invention, the baseband processing device 221 may comprise a plurality of sub-units, each being designed to have the capability of handling the baseband signal processing operations of one or more specific RATs and processing the corresponding IF or baseband signals in compliance with the corresponding communications protocols, so as to support the multi-RAT wireless communications. Therefore, the invention should not be limited to any specific way of implementation.

The processor 222 may control the operations of the modem 220. According to an embodiment of the invention, the processor 222 may be arranged to execute the program codes of the corresponding software module of the modem 220. The processor 222 may maintain and execute the individual tasks, threads, and/or protocol stacks for different software modules. In a preferred embodiment, a protocol stack may be implemented so as to respectively handle the radio activities of one RAT. However, it is also possible to implement more than one protocol stack to handle the radio activities of one RAT at the same time, or implement only one protocol stack to handle the radio activities of more than one RAT at the same time, and the invention should not be limited thereto.

The processor 222 may also read data from the subscriber identity card coupled to the modem, such as the subscriber identity card 140, and write data to the subscriber identity card. The internal memory device 223 may store system data and user data for the modem 220. The processor 222 may also access the internal memory device 223.

The network card 224 provides Internet access services for the communications apparatus. It should be noted that, although the network card 224 shown in FIG. 2 is configured inside of the modem, the invention should not be limited thereto. In some embodiments of the invention, the communications apparatus may also comprise a network card configured outside of the modem, or the communications apparatus may also be coupled to an external network card for providing Internet access services. In some embodiments of the invention, the network card 224 may be a virtual network card, instead of a tangible card, that is created by the operating system of the communications apparatus 100. Therefore, the invention should not be limited to any specific implementation method.

It should be noted that, in order to clarify the concept of the invention, FIG. 2 presents simplified block diagrams in which only the elements relevant to the invention are shown. Therefore, the invention should not be limited to what is shown in FIG. 2.

It should be further noted that in some embodiments of the invention, the modem may also comprise more than one processor and/or more than one baseband processing device. For example, the modem may comprise multiple processors and/or multiple baseband processing devices for supporting multi-RAT operations. Therefore, the invention should not be limited to what is shown in FIG. 2.

It should be further noted that in some embodiments of the invention, the baseband processing device 221 and the processor 222 may be integrated into one processing unit, and the modem may comprise one or multiple such processing units, for supporting multi-RAT operations. Therefore, the invention should not be limited to what is shown in FIG. 2.

Figure 3:
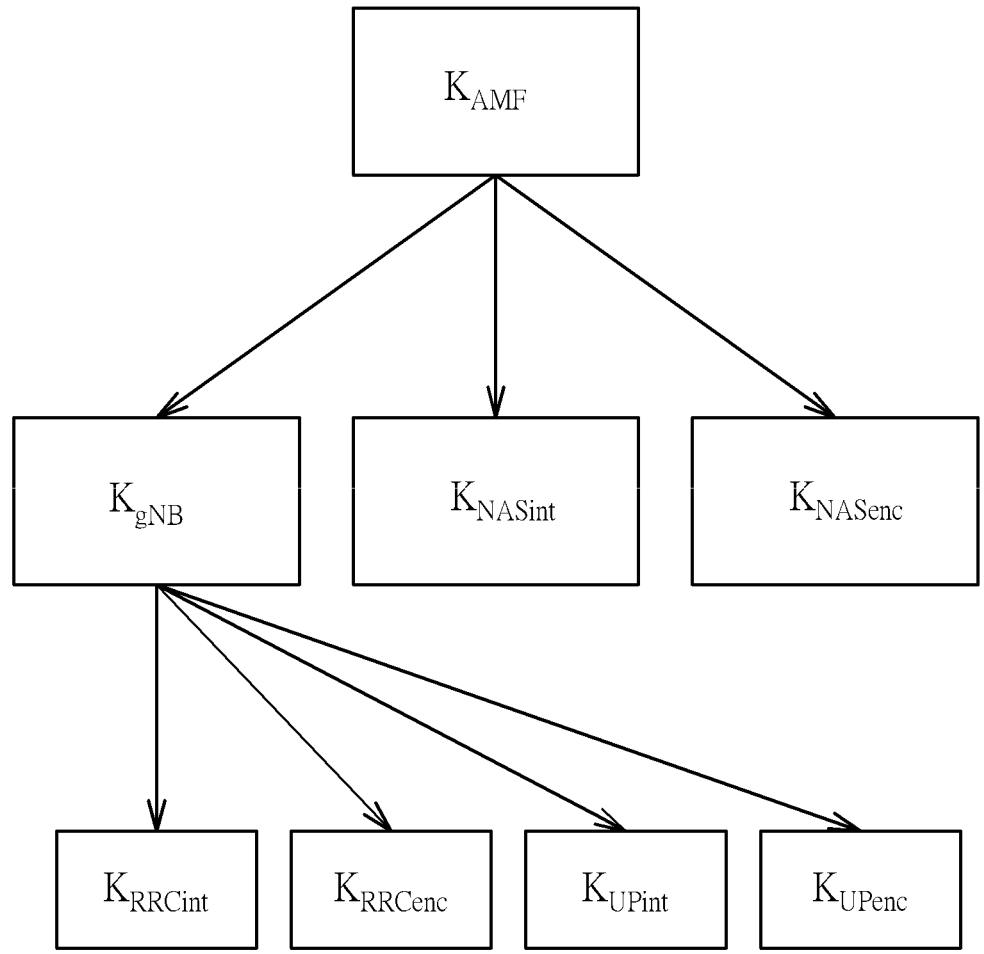
FIG. 3 is a schematic diagram showing the key hierarchy generation in 5G NR system.

FIG. 3 is a schematic diagram showing the key hierarchy generation in 5G NR system. It should be noted that FIG. 3 presents a simplified key hierarchy generation diagram in which only the elements relevant to the invention are shown. For more detailed of the key hierarchy generation with the remaining elements, reference may be made to 3GPP TS 33.501, sub-clause 6.2 Key hierarchy, key derivation, and distribution scheme.

As shown in FIG. 3, the NAS keys $K_{NASint}$ and $K_{NASenc}$ are derived from the security key $K_{AMF}$. The AS keys (which may also be named as the Radio Resource Control (RRC) keys) $K_{RRCint}$, $K_{RRCenc}$, $K_{UPint}$ and $K_{UPenc}$ are derived from the AS key $K_{gNB}$, and the AS key $K_{gNB}$ is also derived from the security key $K_{AMF}$. Therefore, when the security key $K_{AMF}$ has been updated, the NAS keys and the AS keys should be updated as well.

Generally, authentication and key setting may be initiated by the network device in the cellular network as often as the network operator wishes when an active NAS connection exists. Key setting can occur as soon as the identity of the mobile subscriber (i.e. 5G Globally Unique Temporary UE Identifier (5G-GUTI) or Subscription Permanent Identifier (SUPI)) is known by the Access and Mobility Management Function (AMF) (reference may be made to 3GPP TS 33.501, sub-clause 6.2.3.1 Key setting).

The NAS keys derived from the new key $K_{AMF}$ are taken in use in the AMF and the UE by means of the NAS security mode command procedure (reference may be made to 3GPP TS 33.501, sub-clause 6.7.2). Therefore, in an embodiment of the invention, the communications apparatus 100 may perform a NAS security mode command (SMC) procedure to derive the NAS keys $K_{NASint}$ and $K_{NASenc}$ based on the key $K_{AMF}$.

After the NAS keys have been derived, the AS keys shall be updated as well. The AS keys are taken into use with the AS security mode command procedure (reference may be made to 3GPP TS 33.501, sub-clause 6.7.4) or with the key change on the fly procedure (reference may be made to 3GPP TS 33.501, sub-clause 6.9.4).

The AS Key change on-the-fly is accomplished using a procedure based on an intra-cell handover. The integrity protection and ciphering algorithms can be changed with reconfiguration with sync (reference may be made to 3GPP TS 38.331, sub-clause 5.3.1.2 AS Security).

Once the UE has finished a NAS security mode command procedure for updating the NAS keys, the network device will send an RRCReconfiguration message to the UE to change AS keys with at least the following three information element (IE) and the corresponding settings:
ReconfigurationWithSync;
masterKeyUpdate (with the indicator setting: keySetChangeIndicator=TRUE); and
reestablishPDCP (with the setting: reestablishPDCP=TRUE).

The ReconfigurationWithSync is a mandatory procedure in case of AS security key change or some cell change/update situations.

The setting of "keySetChangeIndicator=True" is used in an intra-cell handover procedure when a $K_{gNB}$ key is derived from a $K_{AMF}$ key taken into use through the latest successful NAS SMC procedure, or N2 handover procedure with $K_{AMF}$ change, as described in 3GPP TS 33.501 for $K_{gNB}$ re-keying.

The setting of "reestablishPDCP=True" is used to indicate that Packet Data Convergence Protocol (PDCP) layer should be re-established. The network device sets this to true whenever the security key used for this radio bearer changes.

Figure 4:
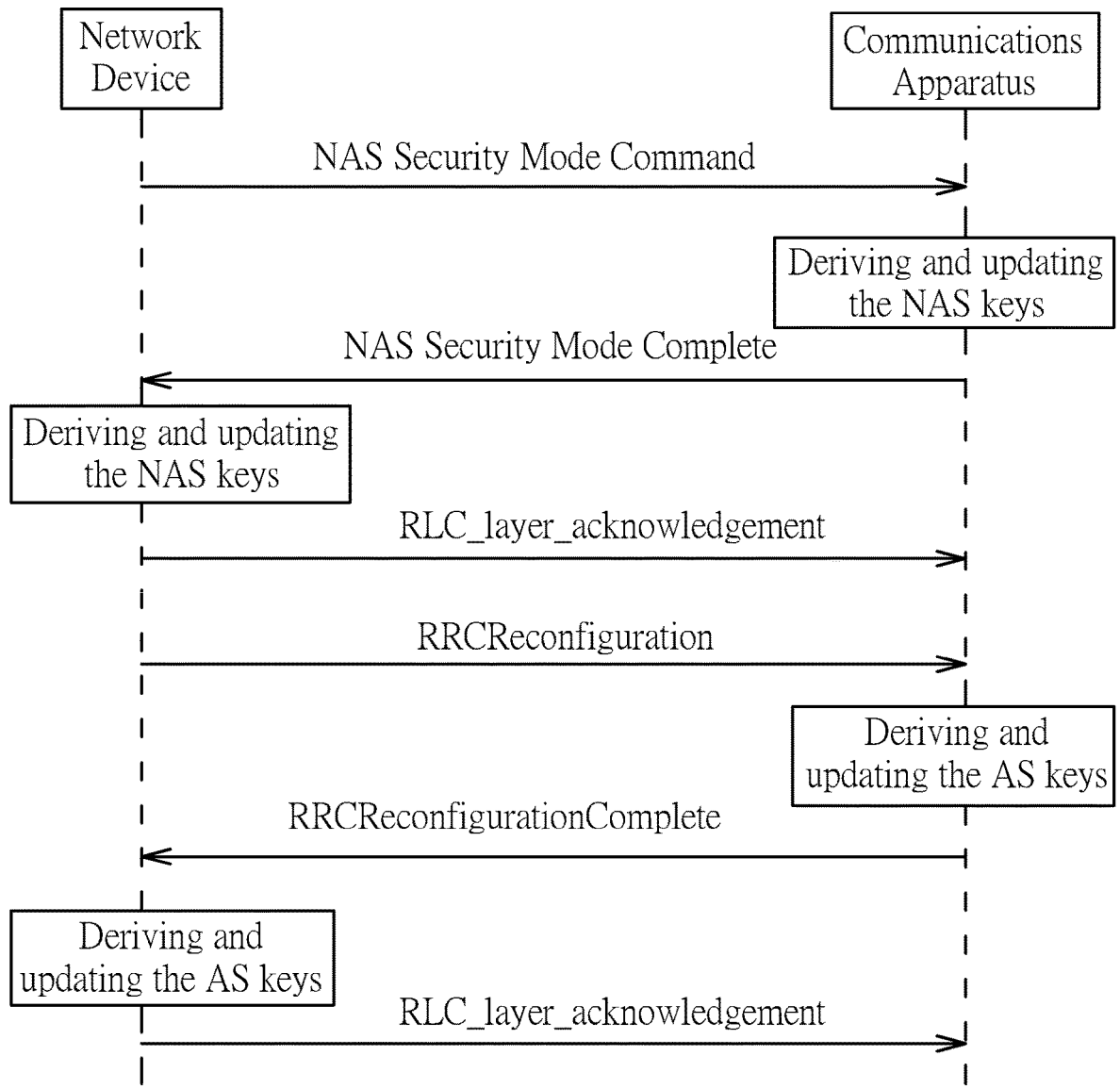
FIG. 4 is an exemplary flow chart showing the message flow between the network device in the cellular network and the communications apparatus.

FIG. 4 is an exemplary flow chart showing the message flow between the network device in the cellular network and the communications apparatus.

The network device may transmit a NAS Security Mode Command message to the communications apparatus 100. In response to the NAS security mode command message, the communications apparatus 100 may perform the NAS security mode command (SMC) procedure to derive the NAS keys, such as the $K_{NASint}$ and $K_{NASenc}$ shown in FIG. 3, based on the key $K_{AMF}$, and update the NAS keys. After that, the communications apparatus 100 may transmit a NAS Security Mode Complete message to the network device for informing the network device that the NAS security mode command procedure is complete.

In response to the NAS Security Mode Complete message, the network device reply an RLC layer acknowledge message RLC_layer_acknowledgement to the communications apparatus 100 for informing the communications apparatus 100 that the NAS Security Mode Complete message has been successfully received.

Next, the network device may further transmit an RRCReconfiguration message to the communications apparatus 100 for triggering a follow-up procedure for deriving the AS keys, such as an intra-cell handover procedure. Upon receiving the RRCReconfiguration message, the communications apparatus 100 may perform the corresponding procedure, such as the intra-cell handover procedure, to derive the AS keys, such as the $K_{RRCint}$, $K_{RRCenc}$, $K_{UPint}$ and $K_{UPenc}$ shown in FIG. 3, and update the AS keys. After that, the communications apparatus 100 may transmit an RRCReconfigurationComplete message to the network device for informing the network device that the intra-cell handover procedure is complete.

In response to the RRCReconfigurationComplete message, the network device reply an RLC layer acknowledge message RLC_layer_acknowledgement to the communications apparatus 100 for informing the communications apparatus 100 that the RRCReconfigurationComplete message has been successfully received.

FIG. 4 presents a normal scenario in which the security keys maintained by the network device and the communications apparatus are synchronized. However, in some abnormal scenario, the security keys maintained by the network device and the communications apparatus may be out of synchronization.

Figure 5:
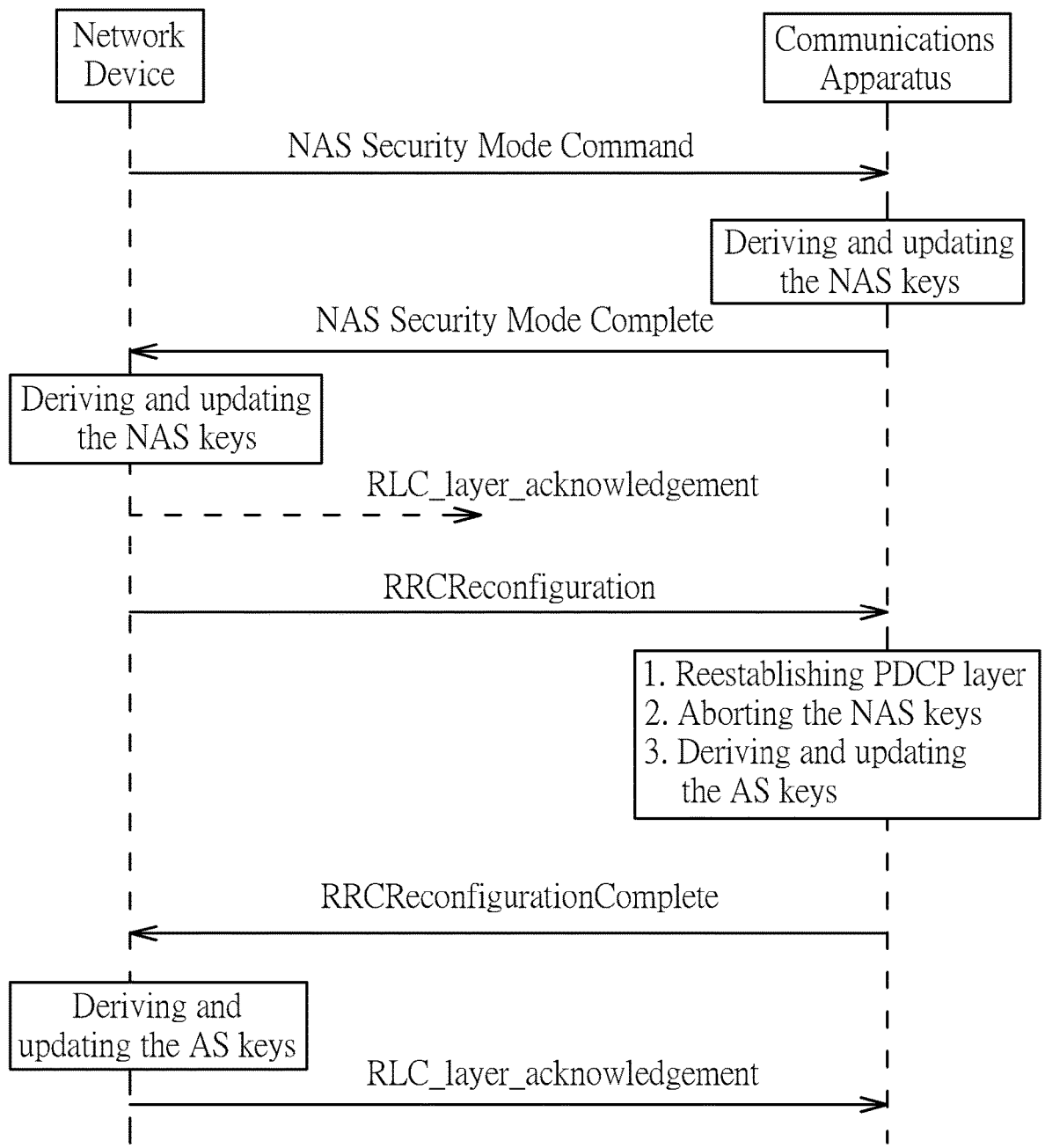
FIG. 5 is another exemplary flow chart showing the message flow between the network device in the cellular network and the communications apparatus.

FIG. 5 is another exemplary flow chart showing the message flow between the network device in the cellular network and the communications apparatus. Different from the scenario shown in FIG. 4, in the abnormal scenario shown in FIG. 5, the RLC layer acknowledge message RLC_layer_acknowledgement for informing the communications apparatus 100 that the NAS Security Mode Complete message has been successfully received has not been received by the communications apparatus 100 before the RRCReconfiguration message arrives.

Such abnormal scenario may occur due to the messages scheduling strategy adopted by the network device. the first Radio Bearer (SRB) SRB1 is configured for carrying the RRC message (which may include a piggybacked NAS message) as well as for NAS messages prior to the establishment of SRB2, and the second SRB SRB2 is configured for carrying the NAS message.

Therefore, the NAS SMC (e.g. the RLC layer acknowledge message RLC_layer_acknowledgement for informing the communications apparatus 100 that the NAS Security Mode Complete message has been successfully received) is carried by the second SRB SRB2, and the RRC SMC (e.g. the RRCReconfiguration message) is carried by the first SRB SRB1.

However, the second SRB SRB2 has a lower priority than the first SRB SRB1. When both an RRC message and a NAS message have to be transmitted at the same time, the transmission of the RRC message should be scheduled earlier than the NAS message. For example, when the network device has to transmit the RLC layer acknowledge message (which is for the NAS Security Mode Complete message) and the RRCReconfiguration message (which is an RRC message), the network device may possibly schedule the transmission of the RRCReconfiguration message prior to the transmission of the RLC layer acknowledge message.

When the communications apparatus 100 receives the RRCReconfiguration message with the setting "reestablishPDCP=TRUE", the communications apparatus 100 has to reestablish the PDCP layer. To be more specific, upon receiving the RRCReconfiguration message, one of the internal protocol layers maintained by the processor 222 (e.g. the RRC layer) may inform another internal protocol layer (e.g. the PDCP layer) to reestablish the PDCP. As defined by the 3GPP standards, in response to this reestablishment request, the PDCP layer shall discard all stored PDCP Service Data Units (SDUs) and PDCP Packet Data Units (PDUs) for the SRBs.

In addition, a lower internal protocol layer (e.g. the Radio Link Control (RLC) layer) will not inform the PDCP layer that the transmission of the NAS Security Mode Complete message is successful because the RLC layer acknowledge message hasn't been received.

Therefore, as the PDCP layer receives the reestablishment request, the PDCP layer shall indicate the NAS Security Mode Complete message transmission failure to RRC layer when the NAS Security Mode Complete message is not acknowledged.

As defined by the 3GPP TS 24.501 sub-clause 5.4.2.6, for the transmission failure of SECURITY MODE COMPLETE message or SECURITY MODE REJECT message indication from lower layers (if the security mode control procedure is triggered by a registration procedure), the UE shall abort the security mode control procedure and re-initiate the registration procedure.

When the security mode control procedure is aborted, the newly derived and updated NAS keys should be aborted as well, and the NAS keys shall be reverted to a previous version that was generated prior to this generation.

In other words, according to the 3GPP standards, when an acknowledge message associated with the NAS security mode complete message has not been received from the network device and the UE receives an RRCReconfiguration message indicating derivation of a set of AS keys from the network device, the UE shall abort the newly derived and updated NAS keys and use the previous NAS keys that were generated prior to this generation.

However, the NAS security mode complete message has been transmitted to the network device successfully, and the network device has already derived and updated the NAS keys in response to the NAS security mode complete message as shown in FIG. 5. In this case, the security keys maintained by the network device and the security keys maintained by the communications apparatus are out of synchronization.

In this case, when the UE uses the reverted NAS keys to perform the re-initiate the registration procedure as defined by the 3GPP standards or perform any other NAS procedure, those procedures will fail due to the key asynchronization.

To solve this problem, novel security key synchronization methods and the associated communications apparatus are provided.

According to a first embodiment of the invention, when the communications apparatus 100 receives both an RRCReconfiguration message indicating derivation of a set of AS keys from the network device as discussed above and an indication of a transmission failure of the NAS security mode complete message after the NAS security mode complete message has been transmitted, the communications apparatus 100 will not abort the newly derived NAS key(s) and will still use the newly derived NAS key(s) to perform a subsequent NAS procedure.

It should be noted that the indication described here is an internal indication transmitted from one of the internal protocol layers maintained by the processor 222 to another internal protocol layer. For example, as discussed above, the PDCP layer may transmit an indication of a transmission failure of the NAS security mode complete message to the RRC layer when the PDCP layer receives the PDCP reestablishment request and determines that it has not been informed by the RLC layer about the success transmission of the NAS Security Mode Complete message.

Figure 6:
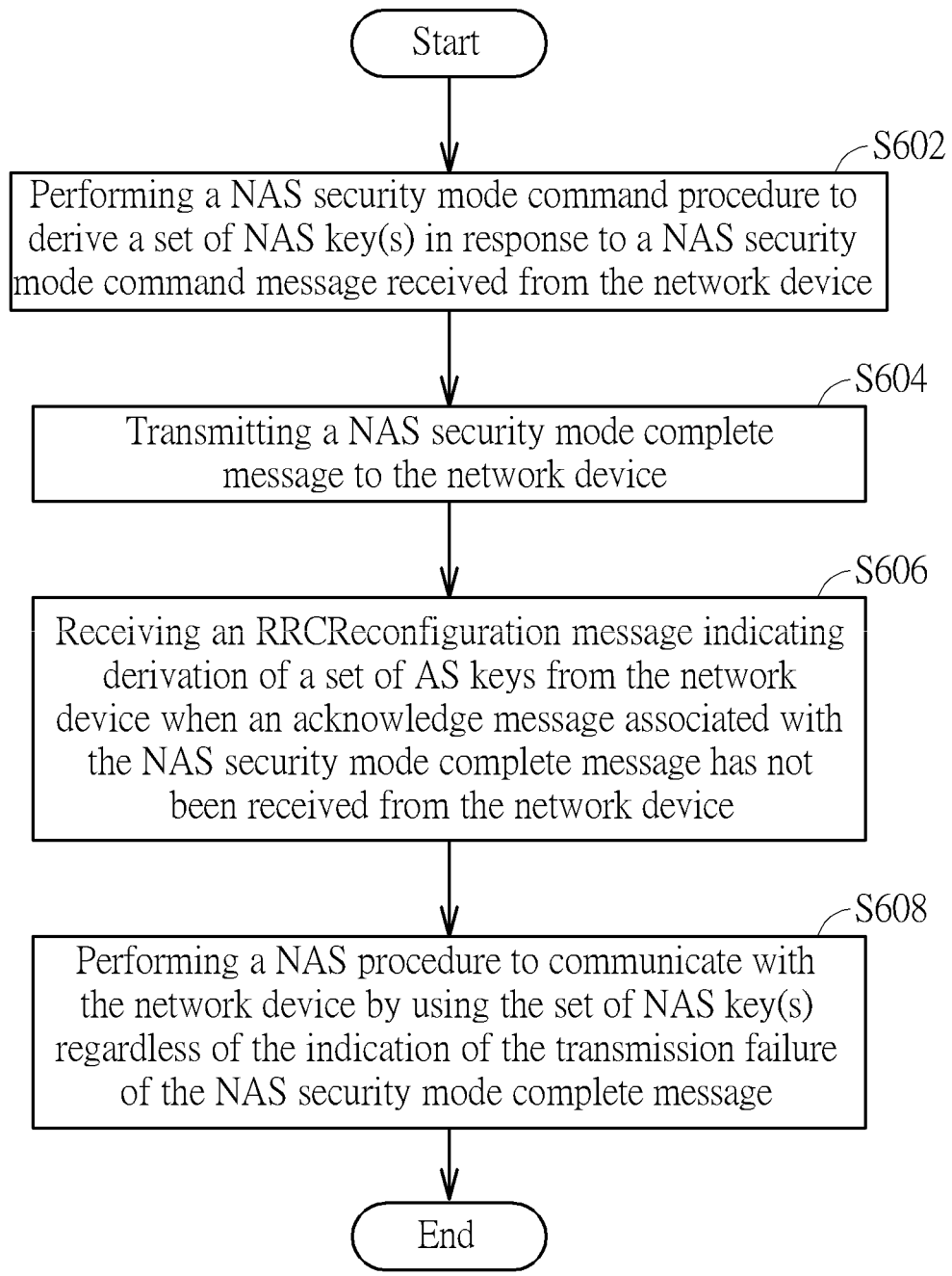
FIG. 6 is an exemplary flow chart of a security key synchronization method for synchronizing security key(s) derived by a communications apparatus with security key(s) derived by a network device according to the first embodiment of the invention.

FIG. 6 is an exemplary flow chart of a security key synchronization method for synchronizing security key(s) derived by a communications apparatus with security key(s) derived by a network device according to the first embodiment of the invention. The security key synchronization method may be performed by the processor 222 of the communications apparatus 100 and comprises the following steps:

Step S602: Performing a NAS security mode command procedure to derive a set of NAS key(s) in response to a NAS security mode command message received from the network device. In the embodiments of the invention, a set of NAS key(s) may comprise one or more NAS keys, such as the $K_{NASint}$ and $K_{NASenc}$ derived based on the key $K_{AMF}$ as discussed above.

Step S604: Transmitting a NAS security mode complete message to the network device for informing the network device that the NAS security mode command procedure is complete.

Step S606: Receiving an RRCReconfiguration message indicating derivation of a set of AS keys from the network device when an acknowledge message associated with the NAS security mode complete message has not been received from the network device. That is, the RRCReconfiguration message has been received but the acknowledge message associated with the NAS security mode complete message has not yet been received.

Step S608: Performing a NAS procedure to communicate with the network device by using the set of NAS key(s) regardless of the indication of the transmission failure of the NAS security mode complete message.

According to an embodiment of the invention, the processor 222 is configured to determine whether to abort the set of newly derived NAS key(s) based on a result of the NAS procedure performed in step. For example, in one embodiment of the invention, the processor 222 is configured to abort the set of NAS key(s) only if the determination result indicating that NAS procedure has failed.

Figure 7:
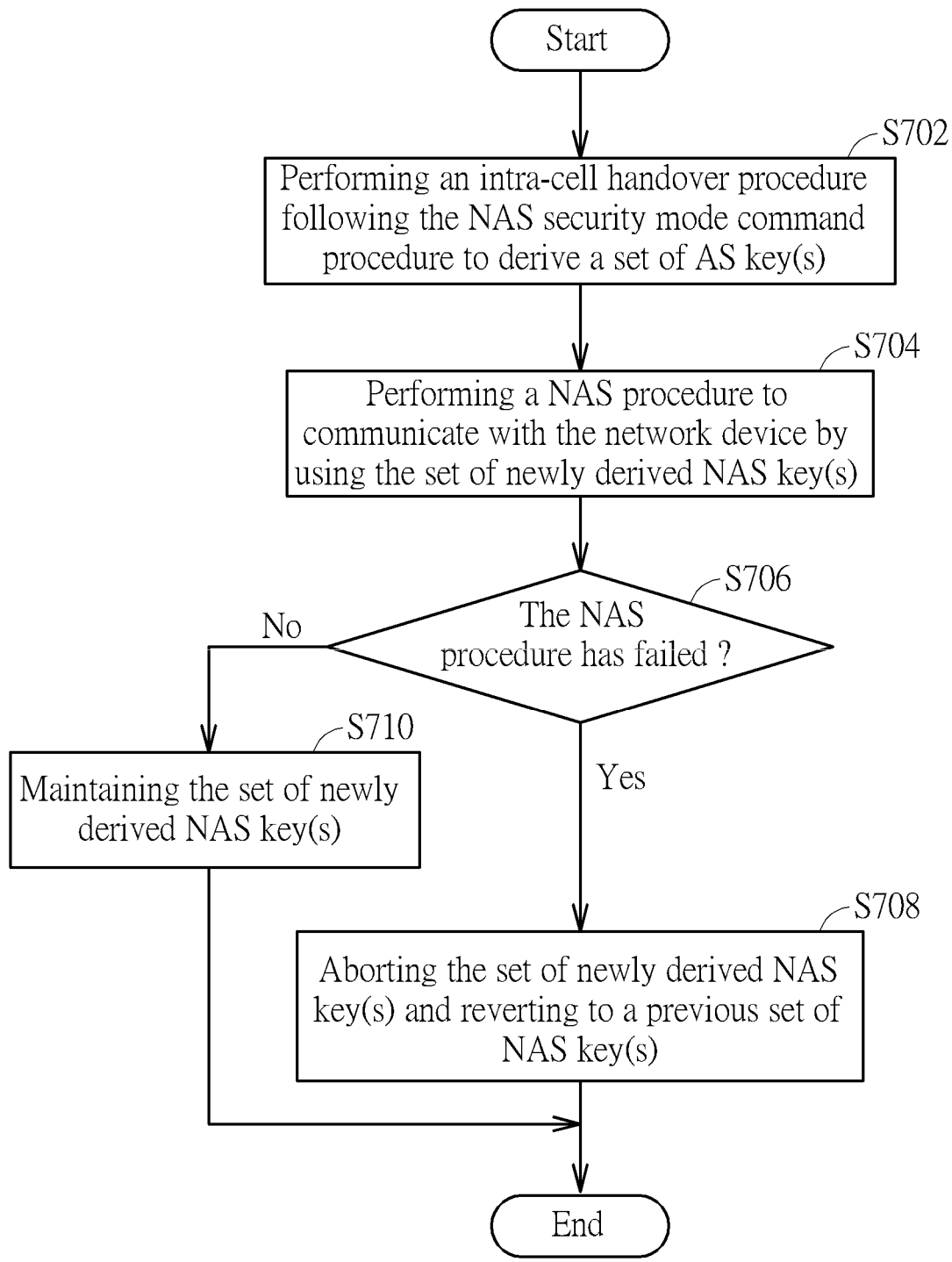
FIG. 7 is another exemplary flow chart of a security key synchronization method for synchronizing security key(s) derived by a communications apparatus with security key(s) derived by a network device according to the first embodiment of the invention.

FIG. 7 is another flowchart of the security key synchronization method for synchronizing security key(s) derived by the communications apparatus with security key(s) derived by the network device according to the first embodiment of the invention. The security key synchronization method may be performed by the processor 222 of the communications apparatus 100 and comprises the following steps:

Step S702: Performing an intra-cell handover procedure following the NAS security mode command procedure to derive a set of AS key(s) in response to an RRCReconfiguration message (Reconfiguration with sync) indicating derivation of the AS key(s) received from the network device. The RRCReconfiguration message may be received after the NAS security mode command procedure has been triggered and/or after the NAS security mode complete message has been transmitted.

Step S704: Performing a NAS procedure to communicate with the network device by using the set of newly derived NAS key(s) without aborting the set of newly derived NAS key(s) after receiving the indication. That is, the communications apparatus 100 may still use the newly derived NAS key(s) to communicate with the network device regardless of the indication of the transmission failure of the NAS security mode complete message.

According to the first embodiment of the invention, since the processor has completed the NAS security mode command procedure, the processor try to communicate with the network device by using the newly derived NAS key(s) without reverting to the previously derived NAS key(s), and then determine whether to abort the newly derived NAS key(s) based on a result of the NAS procedure performed in step S704.

Step S706: Determining whether the NAS procedure has failed.

Step S708: Aborting the set of newly derived NAS key(s) responsive to a determination result indicating that NAS procedure has failed and reverting to a previous set of NAS key(s).

When the NAS procedure performed in step S706 by using the set of newly derived NAS key(s) is determined as failed, the processor 222 knows that the NAS key(s) newly derived by the communications apparatus is not synchronized with security key(s) derived by the network device. In this manner, responsive to the failure of the NAS procedure protected by the newly derived NAS key(s), the processor is configured to fallback to conduct the registration procedure by using the previously derived NAS key(s) (the previously derived NAS key(s)) as defined in 3GPP TS 24.501 subclause 5.4.2.6.

In addition, after aborting the NAS key(s), when there is another subsequent NAS procedure has to be performed, the processor may perform the NAS procedure to communicate with the network device by using the previous set of NAS key(s) (the previously derived NAS key(s)).

Step S710: Maintaining the set of newly derived NAS key(s) responsive to a determination result indicating that NAS procedure has succeeded.

When the NAS procedure performed in step S704 by using the first set of NAS key(s) is determined as successful, the processor 222 knows that the NAS key(s) newly derived by the communications apparatus is synchronized with security key(s) derived by the network device. In this manner, the processor maintains the set of newly derived NAS key(s) and performs another subsequent NAS procedure to communicate with the network device by using the set of newly derived NAS key(s).

According to an embodiment of the invention, when determining whether the NAS procedure has failed, the processor 222 may check whether a response message has been received from the network device within a predetermined period of time and determine that the NAS procedure performed in step S608 or step S704 has failed responsive to a check result indicating that no response message has been received from the network device within the predetermined period of time.

For example, the processor 222 may transmit a service request message to the network device to trigger or perform a NAS procedure and setup a timer to wait for a response message. When neither a service accept message nor a service reject message has been received from the network device as the timer expires, the processor 222 may determine that the NAS procedure performed in step S608 or step S704 has failed.

According to another embodiment of the invention, when determining whether the NAS procedure has failed, the processor 222 may decode a downlink message received from the network device in the NAS procedure and determine that the NAS procedure has failed responsive to a decoding result indicating that the downlink message is unable to be successfully decoded.

For example, the network device may transmit a notification message to the communications apparatus 100 to reestablish the PDU resource. Upon receiving the notification message, the processor 222 may try to decode the notification message. If the processor 222 is unable to successfully decode the notification message, it means that the NAS keys maintained by the communications apparatus 100 and the network device are out of synchronization and the processor 222 may determine that the NAS procedure performed in step S608 or step S704 has failed.

According to a second embodiment of the invention, to avoid the occurrence of the abnormal scenario in which the transmission of the RRCReconfiguration message (Reconfiguration with sync) is prior to the transmission of the acknowledge message RLC_layer_acknowledgement as discussed above, a confirmation mechanism may be introduced for the network device to guarantee that the RLC acknowledgement message of the NAS Security Mode Complete message will always be transmitted prior to the RRCReconfiguration message.

For example, the network device may transmit the RRCReconfiguration message for triggering the Reconfiguration with sync to regenerate the AS keys after the network device knows that the acknowledge message RLC_layer_acknowledgement has been successfully received by the communications apparatus 100. As an example, the network device may check the buffer status report transmitted by the communications apparatus 100 to know whether the acknowledge message RLC_layer_acknowledgement has been successfully received by the communications apparatus 100.

According to a third embodiment of the invention, to avoid the occurrence of the key asynchronization as discussed above, a novel information element field may be introduced in the RRCReconfiguration message (Reconfiguration with sync) for indicating whether to use the NAS key generated from the latest NAS security mode command procedure (the NAS rekey procedure) or not. For example, the network device may set the new Boolean indicator "Is NAS REKEY", which is utilized to notify communications apparatus 100 to use the NAS key generated from the latest NAS rekey procedure, in RRCReconfiguration message. Based on this indicator, the communications apparatus 100 may have a clear idea about which set of NAS key(s) should be used in the current procedure.

In summary, based on the novel security key synchronization methods and the associated communications apparatus as discussed above, the key asynchronization can be solved. In this manner, the communication quality and performance of the communications apparatus 100 can be greatly improved.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A communications apparatus, comprising:
a transceiver, transmitting or receiving wireless signals to communicate with a network device; and
a processor, coupled to the transceiver and configured to perform operations comprising:
performing a Non Access Stratum (NAS) security mode command procedure to derive a new set of NAS key(s) in response to a NAS security mode command message received from the network device;
transmitting a NAS security mode complete message to the network device for informing the network device that the NAS security mode command procedure is complete; and
performing a NAS procedure to communicate with the network device by using the new set of NAS key(s) instead of any sets of NAS key(s) derived before deriving the new set of NAS key(s) in response to reception of an RRCReconfiguration message indicating derivation of a set of Access Stratum (AS) keys from the network device when an acknowledge message associated with the NAS security mode complete message has not been received from the network device after transmitting the NAS security mode complete message.

2. The communications apparatus of claim 1, wherein the processor is further configured to perform operation comprising:
determining whether the NAS procedure has failed;
aborting the new set of NAS key(s) based on a determination result.

3. The communications apparatus of claim 2, wherein in the step of aborting the new set of NAS key(s) based on the determination result, the processor further performs operations comprising:
aborting the new set of NAS key(s) responsive to the determination result indicating that NAS procedure has failed.

4. The communications apparatus of claim 3, wherein the processor is further configured to perform operations comprising:
performing another NAS procedure to communicate with the network device by using a previous set of NAS key(s) after aborting the new set of NAS key(s).

5. The communications apparatus of claim 2, wherein in the step of aborting the new set of NAS key(s) based on the determination result, the processor further performs operations comprising:
aborting the new set of NAS key(s) only if the determination result indicating that NAS procedure has failed.

6. A security key synchronization method for synchronizing security key(s) derived by a communications apparatus with security key(s) derived by a network device, wherein the security key synchronization method is performed by a processor of the communications apparatus and comprises:
performing a Non Access Stratum (NAS) security mode command procedure to derive a new set of NAS key(s) in response to a NAS security mode command message received from the network device;
transmitting a NAS security mode complete message to the network device for informing the network device that the NAS security mode command procedure is complete; and
performing a NAS procedure to communicate with the network device by using the new set of NAS key(s) instead of any sets of NAS key(s) derived before deriving the new set of NAS key(s) in response to reception of an RRCReconfiguration message indicating derivation of a set of Access Stratum (AS) keys from the network device when an acknowledge message associated with the NAS security mode complete message has not been received from the network device after transmitting the NAS security mode complete message to the network device.

7. The security key synchronization method of claim 6, further comprising:

determining whether the NAS procedure has failed;
aborting the new set of NAS key(s) based on a determination result.

8. The security key synchronization method of claim 7, wherein the step of aborting the new set of NAS key(s) based on the determination result further comprises:
aborting the new set of NAS key(s) responsive to the determination result indicating that NAS procedure has failed.

9. The security key synchronization method of claim 8, further comprising:
performing another NAS procedure to communicate with the network device by using a previous set of NAS key(s) after aborting the new set of NAS key(s).

10. The security key synchronization method of claim 6, wherein the step of aborting the new set of NAS key(s) based on the determination result further comprises:
aborting the new set of NAS key(s) only if the determination result indicating that NAS procedure has failed.

* * * * *